United States Patent [19]

Brooks et al.

[11] 4,292,878
[45] Oct. 6, 1981

[54] AMMUNITION ORIENTATION MECHANISM

[75] Inventors: George D. Brooks, Burlington; Donald J. Bushey, Sr., Milton, both of Vt.

[73] Assignee: General Electric Company, Burlington, Vt.

[21] Appl. No.: 69,461

[22] Filed: Aug. 24, 1979

[51] Int. Cl.³ .............................................. F42B 39/10
[52] U.S. Cl. ...................................... 86/48; 89/33 BB; 198/399
[58] Field of Search ........................ 86/45, 46, 47, 48; 89/33 BB; 198/399

[56] References Cited

U.S. PATENT DOCUMENTS

| | | |
|---|---|---|
| 1,282,610 | 10/1918 | Macomber . |
| 2,362,517 | 11/1944 | Woodberry . |
| 2,377,431 | 6/1945 | Lakso . |
| 2,406,176 | 8/1946 | Vergobbi . |
| 2,895,589 | 7/1959 | Rostron ............................... 198/399 |
| 3,380,343 | 4/1968 | Chiabrandy et al. ................... 89/12 |
| 3,429,221 | 2/1969 | Kirkpatrick ...................... 89/33 BB |
| 3,696,704 | 10/1972 | Backus et al. ..................... 89/33 BB |
| 3,722,659 | 3/1973 | Aidlin et al. . |
| 4,004,490 | 1/1977 | Dix et al. ............................ 89/33 D |
| 4,137,820 | 2/1979 | Clemens ........................... 89/33 BB |

FOREIGN PATENT DOCUMENTS 579204 12/1977 U.S.S.R. ............................. 198/399

Primary Examiner—Stephen C. Bentley
Attorney, Agent, or Firm—Bailin L. Kuch

[57] ABSTRACT

A feature of this invention is a system including a buffer storage means for receiving rounds of ammunition, means for receiving therefrom the rounds in either of two orientations and for aligning them into a common orientation, and means for receiving therefrom the rounds with or without cardboard tubes and for removing any such tubes.

2 Claims, 3 Drawing Figures

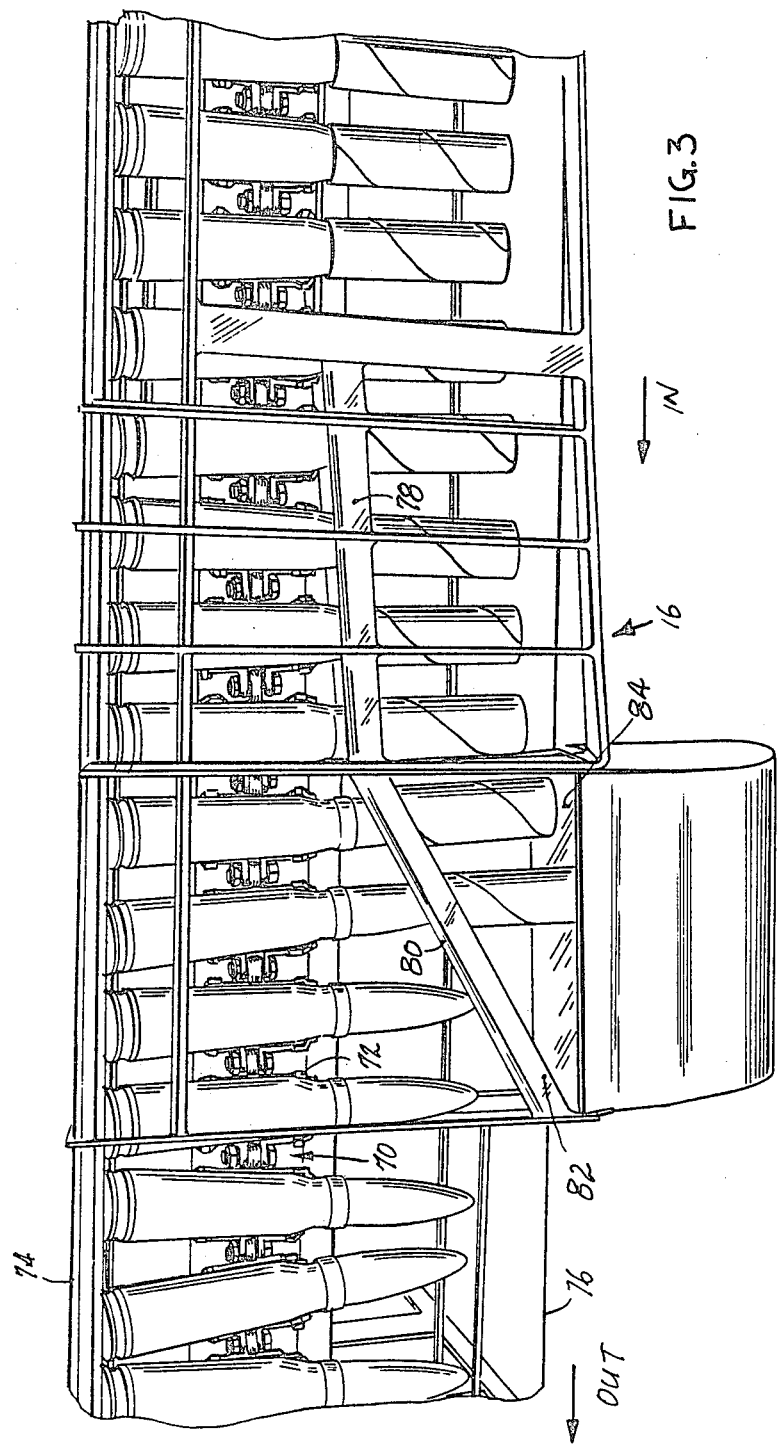

AMMUNITION ORIENTATION MECHANISM

BACKGROUND OF THE INVENTION

1. Field of the Invention

This invention relates generally to automatic systems for orienting a plurality of elongated articles in a common head to toe orientation which are provided in a random head to toe orientation, and specifically to such a system for orienting and feeding a plurality of rounds of ammunition.

2. Prior Art

Most high rate of fire guns, such as are shown, for example, in U.S. Pat. No. 3,380,343, issued Apr. 30, 1968 to R. E. Chiabrandy et al, utilize rounds of ammunition without links which are fed to the feeder of the gun by an endless conveyor, such as is shown, for example, in U.S. Pat. No. 3,429,221, issued Feb. 25, 1969 to R. G. Kirkpatrick, from a storage system, such as is shown, for example, in U.S. Pat. No. 4,004,490, issued Jan. 25, 1977 to J. Dix et al. To provide quick aircraft loading turnaround time and reduce the possibility of foreign object damage by eliminating the use of linked ammunition on the flight line, the loading of the rounds into the storage systems, may use a bulk loader system, such as is shown, for example, in U.S. Pat. No. 3,696,704, issued Oct. 10, 1972 to L. F. Backus et al. This bulk loader system may be replenished with bulk packaged ammunition, rather than conventional linked ammunition, to provide significant life cycle cost savings by reduction of required storage area, lower shipping and munitions costs, and lower net manpower costs. Bulk ammunition, for example, 20 mm rounds, is available in two configurations: (1) Ammunition packaged two hundred rounds per shipping container and incorporating cardboard dunnage both in sheet form to separate the rounds from all sides of the container and in the form of tubes which respectively encase each individual projectile. The full container weighs approximately 140 pounds and each round is alternately oriented to provide maximum packing density. (2) Loose bulk ammunition, without cardboard, as unfired rounds and cleared rounds from previous firing missions.

Accordingly, it is an object of this invention to provide a system for automatically transferring bulk and loose ammunition, with or without cardboard tubes on the projectiles, to a storage system, with all rounds oriented in the same direction and any tubes removed.

Article handling systems, in addition to those previously mentioned, are found, for example, in U.S. Pat. No. 4,137,820, issued Feb. 6, 1979 to J. E. Clemens; U.S. Pat. No. 3,722,659, issued Mar. 27, 1973 to S. S. Aidlin et al; U.S. Pat. No. 2,406,176, issued Aug. 20, 1946 to R. W. Vergobbi; U.S. Pat. No. 2,377,431, issued June 5, 1945 to E. E. Lakso; U.S. Pat. No. 2,362,517, issued Nov. 14, 1944 to J. H. Woodberry; and U.S. Pat. No. 1,282,610, issued Oct. 22, 1918 to W. I. Macomber.

A feature of this invention is a system including a buffer storage means for receiving rounds of ammunition, means for receiving therefrom the rounds in either of two orientations and for aligning them into a common orientation.

BRIEF DESCRIPTION OF THE DRAWING

These and other objects, advantages and features of the invention will be apparent from the following specification thereof taken in conjunction with the accompanying drawing in which:

FIG. 3 is a perspective view of the tube stripping mechanism of the system of FIG. 1.

DESCRIPTION OF THE INVENTION

Figures 1, 2:
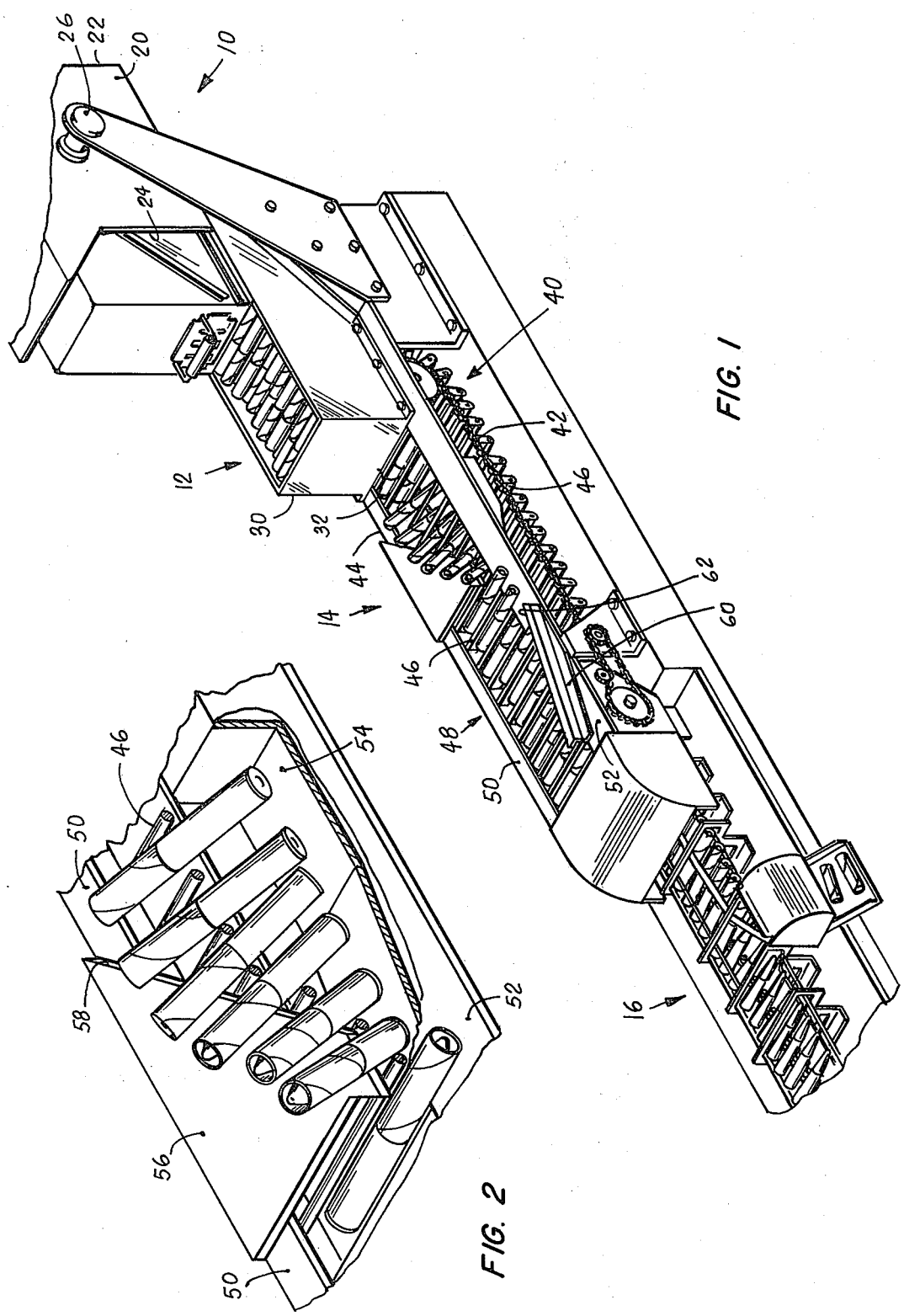
FIG. 1 is a side view in elevation of a system embodying this invention.
FIG. 2 is a perspective view of the round reorienting mechanism of the system of FIG. 1.

The system, as shown in FIG. 1, includes an ammunition can unloading mechanism 10, a buffer storage mechanism 12, a round reorienting mechanism 14 and a tube stripping mechanism 16.

The unloading mechanism 10 includes a sleeve 20 of rectangular cross-section and having two open ends 22 and 24 into which and from which an ammunition can 26 may be slid. The sleeve is journaled at 26, for 180° of rotation, about the center of gravity of the sleeve plus a fully filled can of ammunition. Thereby a can of ammunition, having an open top, can be slid into the sleeve, from the right as seen in FIG. 1, so that the sleeve traps the rounds in the can. The sleeve can then be pivoted so that the can within is now upside down, and then the can can be progressively withdrawn to the left so that the rounds fall out of the can into the buffer storage mechanism 12, while retaining the axial orientation of the rounds.

The buffer storage mechanism 12 includes a hopper 30 having a rectangular open top and flat sidewalls spaced apart by the length of a round of ammunition with a cardboard tube on its projectile. The hopper has a slot 32 in its bottom adapted to pass out one round of ammunition at a time.

As is also shown in FIG. 2, the round reorienting mechanism 14 includes an endless conveyor 40, having a left chain 42 and a right chain 44 (not visible) carrying a plurality of double rungs 46 therebetween. Immediately adjacent double rungs are spaced apart by a distance adequate to receive a round of ammunition. The upper flight of the endless conveyor rides over a table 48 having a right sidewall 50 and a left sidewall 52. The incoming end of the upper flight passes under the slot of the hopper so that each round in sequence is received between immediately adjacent double rungs. Downstream of the incoming end of the upper flight, a longitudinally extending recess or pocket 54 is formed abruptly in the table 48. The width of the recess is such that if a round of ammunition has its projectile over the recess, its center of gravity will be over the table; but if its base is over the recess, its center of gravity will be over the recess and the round, base down, will tilt into the recess, with the base riding along the bottom of the recess. A reorienter cam plate 56 is fixed to the right sidewall 50 and has a diagonal leading edge 58 which clears each round which is lying flat in the conveyor, but which abuts any round which is tilted into the recess. The leading edge progressively cams each tilted round upright as the conveyor carries it along, until the upper end of each round leaves the leading edge and falls over to ride on the left sidewall 52, while its lower end rides on the bottom of the recess. The bottom of the downstream end portion of the recess progressively ramps upwardly at 59 back to the level of the table 48. An aligner cam plate 60 is fixed to the left sidewall and has a diagonal leading edge 62 which abuts any round whose now-tilted-over end is riding along the left sidewall and progressively cams such rounds towards the right sidewall until such rounds fall off the left sidewall and are again flat on the table between the double rungs, with all rounds now aligned in the conveyor 40.

The tube stripping mechanism 16 includes an endless conveyor 70 of carriers 72 for rounds of ammunition, as shown, for example, in U.S. Pat. No. 3,429,221, supra. The incoming end of the upper flight of the conveyor 70 passes under the outgoing end of the conveyor 40 so that each carrier 72 receives a respective aligned round from the conveyor 40. The upper flight of the conveyor 70 runs between a right sidewall 74 and a left sidewall 76. A longitudinally tube stripping cam plate 78 is fixed between the sidewalls and has a lower margin 80 disposed to abut the right ends of any cardboard tube on a projectile, and yet clear the projectile. The downstream portion 82 of the plate is bent gradually towards the left sidewall 76 and progressively shifts each tube off its respective projectile towards and into an opening 84 in the left sidewall, until each tube is discharged through the opening 84 while the respective round continues along in its respective carrier.

The outgoing end of the upper flight of the conveyor 70 now carries aligned rounds free of tubes and may be coupled, as by handoff sprockets, as shown in U.S. Pat. No. 3,429,221, supra, to the bulk loader, as shown in U.S. Pat. No. 3,696,704, supra.

What is claimed is:

1. An ammunition handling system for a plurality of fixed cased rounds of ammunition, each round having a center of gravity which is spaced a first distance from a first end thereof and a second distance from the second end thereof, the first distance being greater than the second distance, each said round having a removable sleeve disposed on a portion thereof adjacent one of said ends, said system comprising:
    a longitudinally advancing endless conveyor having an upper flight having a train of transversely elongated, open top and bottom passageways, each passageway for receiving through its open top a respective round of ammunition in either of a first or second end to end orientation, and for discharging through its open bottom such round of ammunition;
    a table surface disposed under said upper flight for precluding the discharge through said open bottoms of said passageways the rounds of ammunition respectively received therein;
    a longitudinally extending recess in said table surface having a floor surface disposed below said table surface and so located transversely, that when a round of ammunition is in a passageway passing over said recess and in said first orientation, its respective center of gravity lies over said recess, thereby causing said second end of such round of ammunition to tilt downwardly into said recess while such round of ammunition is advancing longitudinally with said passageway, and when a round of ammunition is in a passageway passing over said recess and in said second orientation, its respective center of gravity lies over said table surface, thereby causing such round of ammunition to remain undisturbed while such round of ammunition is advancing longitudinally with said passageway;
    a cam surface extending progressively longitudinally and transversely adjacent said conveyor for engaging in sequence any upwardly projecting of said first ends of any rounds of ammunition which have their said second ends tilted downwardly into said recess to shift the angle of tilt beyond the perpendicular, whereby to change the orientation of such round of ammunition within its respective passageway;
    a ramp surface providing a continuum between said floor surface and said table surface disposed adjacent said conveyor longitudinally downstream of said cam surface, for engaging in sequence any downwardly tilted said second ends of rounds of ammunition for restoring in sequence such rounds of ammunition back into their respective passageways; and
    sleeve removing means disposed downstream of said ramp surface for automatically removing the sleeve from each round of ammunition in sequence.

2. A process of sorting a plurality of fixed cased rounds of ammunition, contained in a receptacle in non-uniform end to end orientation, each round having a center of gravity which is spaced a first distance from a first end thereof and a second distance from the end thereof, the first distance being greater than the second distance, each said round having a removable sleeve disposed on a portion thereof adjacent one of said ends, comprising:
    discharging the rounds sequentially into a train of such rounds flowing along a first surface downstream with each round lying transverse to the direction of flow in either of a first or second end to end orientation.
    passing each round in the train over a recess so that a round in said first orientation has its respective center of gravity over said recess and the second end of said round tilts downwardly into said recess while a round in said second orientation has its respective center of gravity over said first surface and does not tilt,
    shifting the angle of tilt beyond the perpendicular of any tilted round to change its orientation from first orientation to second orientation and restoring any tilted round back to said first surface so that all rounds in the train are in the second orientation, and
    removing the sleeve from each round in sequence.

* * * * *